Du Bois & Beugler,
Cutter Head.

No. 101,238. Patented Mar. 29, 1870.

Inventor:
John Du Bois.
C. F. Beugler.

Witnesses:
Geo. R. Vosburg.
James M. Beugler.

United States Patent Office.

JOHN DU BOIS AND EDWIN F. BEUGLER, OF WILLIAMSPORT, PENNSYLVANIA.

Letters Patent No. 101,238, dated March 29, 1870.

IMPROVEMENT IN FASTENING FOR CUTTER-HEADS, PULLEYS, &c.

The Schedule referred to in these Letters Patent and making part of the same.

*To all whom it may concern:*

Be it known that we, JOHN DU BOIS and EDWIN F. BEUGLER, of the city of Williamsport, in the county of Lycoming and State of Pennsylvania, have invented a new and useful Improvement for Fastening Pulleys, Cutter-Heads, &c., on round shafts without the use of key-seat or set-screws; and we hereby declare that the following is a full and exact description of the same.

Our invention consists of a taper bushing slit in two or more sections at the large end the full length of the hub in which it is to be used, leaving sufficient length on the same, not parted by the slitting, to form a nut or screw.

When the bushing is made with the screw on its end, a nut is fitted for the purpose of drawing the bushing into the hub by screwing it on the bushing against the end of the hub, thereby drawing the bushing into the hub, and contracting the bushing onto the shaft, and keying it firmly in the position desired.

When the nut is used in the end of the bushing, a screw-bolt is fitted in the nut of the bushing in such a manner as to draw the bushing in the hub, as above described, reference being had to the accompanying drawings forming part of this specification, in which—

Similar letters of reference in the two figures indicate corresponding parts.

Figure 1:
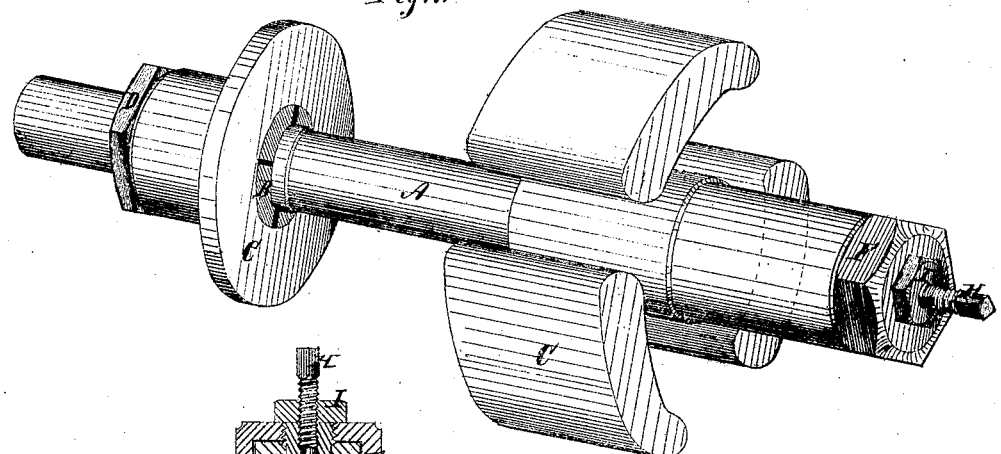
Figure 1 is a perspective view of a pulley and cutter-head upon a shaft.
Figure 2:
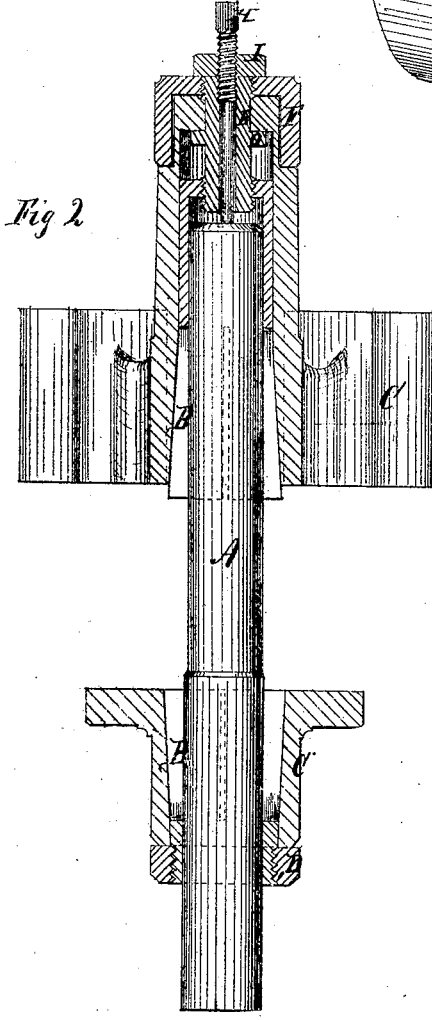
Figure 2 is a sectional view of pulley, cutter-head, and shaft, divided in the centers.
Figure 3:
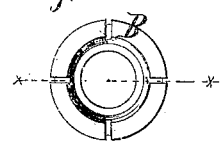

A represents the shaft to be fastened upon.

B is the bushing inserted in hub of pulley or cutter-head C.

D is nut on bushing of pulley C.

E is a screw-bolt in end of bushing used in the cutter-head.

F is the head of screw-bolt E for turning the same.

G is a collar on the screw-bolt E for the purpose of holding it in position while forcing the bushing out of the cutter-head, thereby loosening the cutter-head from the shaft.

H is an adjusting screw-bolt to regulate the position of the cutter-head on the shaft.

I is a jam-nut on the adjusting screw-bolt H.

What we claim, and desire to secure by Letters Patent, is—

The taper bushing, substantially as set forth, for the purposes within named.

Witness our hands in the matter of our application for Letters Patent on our improvement in fastening pulleys, cutter-heads, &c., on round shafts.

JOHN DU BOIS.
E. F. BEUGLER.

Witnesses:
GEO. R. VOSBURG,
JAMES M. BEUGLER.